(12) United States Patent
Wobben (10) Patent No.: US 8,393,864 B2
(45) Date of Patent: Mar. 12, 2013

(54) METHOD FOR OPERATING A WIND TURBINE

(76) Inventor: Aloys Wobben, Aurich (DE)

( * ) Notice: Subject to any disclaimer, the term of this patent is extended or adjusted under 35 U.S.C. 154(b) by 33 days.

(21) Appl. No.: 12/965,662

(22) Filed: Dec. 10, 2010

(65) Prior Publication Data

US 2011/0081226 A1 Apr. 7, 2011

Related U.S. Application Data

(63) Continuation of application No. 10/558,041, filed as application No. PCT/EP2004/005164 on May 14, 2004, now Pat. No. 7,857,586.

(30) Foreign Application Priority Data

May 23, 2003 (DE) .................................. 10323785

(51) Int. Cl.
*F03D 7/04* (2006.01)
(52) U.S. Cl. ................... 416/1; 416/35; 416/39; 416/61
(58) Field of Classification Search ................ 416/1, 35, 416/37, 39, 40, 44, 61
See application file for complete search history.

(56) References Cited

U.S. PATENT DOCUMENTS

| | | | |
|---|---|---|---|
| 4,095,120 A | 6/1978 | Moran et al. .................... | 290/44 |
| 4,160,170 A | 7/1979 | Harner et al. ................... | 290/44 |
| 4,189,648 A | 2/1980 | Harner ............................ | 290/44 |
| 4,193,005 A | 3/1980 | Kos et al. ........................ | 290/44 |

(Continued)

FOREIGN PATENT DOCUMENTS

| | | |
|---|---|---|
| DE | 195 28 862 | 2/1997 |
| DE | 195 32 409 | 3/1997 |

(Continued)

OTHER PUBLICATIONS

Burton et al., Wind Energy Handbook, 2001, "Closed-loop Control: Issues and Objectives", excerpt p. 475.

(Continued)

*Primary Examiner* — Edward Look
*Assistant Examiner* — Aaron R Eastman
(74) *Attorney, Agent, or Firm* — Seed IP Law Group PLLC (57) ABSTRACT

The present disclosure relates to a method for operating a wind turbine with the steps: detection of the values of predetermined operating parameters by means of suitable sensors, detection of at least one predetermined initial condition, comparison of the detected values to stored values of the operating parameters. The disclosure further relates to a wind turbine for implementing the method. Therefore, the object of the present disclosure is, to be able to adapt the operation of a wind turbine to changes using a method of the type named above, such that when the detected parameter values deviate from the stored parameter values, as a function of the initial condition, either the stored parameter values are adapted to the detected parameter values or the operation of the wind turbine is influenced as a function of the detected parameter values. In this way, the disclosure is based on the knowledge that, from a pragmatic view, the formation of ice on a rotor blade is also a (temporary, meteorologically-related) change to the rotor blade shape. From this it follows that the formation of ice on the rotor blades always leads to a change of the aerodynamic profile and thus to a negative effect of the output of the wind turbine. However, deviations from this shape and thus deviations in the magnitude of the generated output also result just from manufacturing-dependent deviations of the rotor blades from the predetermined optimum shape and from gradual soiling of the rotor blades during operation.

15 Claims, 4 Drawing Sheets

U.S. PATENT DOCUMENTS

| | | | | |
|---|---|---|---|---|
| 4,297,076 | A | 10/1981 | Donham et al. | 416/37 |
| 4,372,157 | A | 2/1983 | Caruthers et al. | 73/147 |
| 4,410,806 | A * | 10/1983 | Brulle | 290/44 |
| 4,524,620 | A | 6/1985 | Wright et al. | 73/587 |
| 5,155,375 | A * | 10/1992 | Holley | 290/44 |
| 5,224,664 | A * | 7/1993 | Adams et al. | 244/17.13 |
| 5,289,041 | A | 2/1994 | Holley | 290/44 |
| 5,402,332 | A | 3/1995 | Kopf | 364/149 |
| 5,584,655 | A | 12/1996 | Deering | 416/31 |
| 6,320,272 | B1 | 11/2001 | Lading et al. | 290/44 |
| 6,361,275 | B1 * | 3/2002 | Wobben | 416/33 |
| 6,525,518 | B1 * | 2/2003 | Garnaes | 324/76.13 |
| 6,840,734 | B2 | 1/2005 | Hansen | 415/1 |
| 7,101,152 | B2 | 9/2006 | Wobben | 415/1 |
| 7,124,631 | B2 * | 10/2006 | Wobben | 73/170.15 |
| 2002/0000723 | A1 * | 1/2002 | Weitkamp | 290/44 |
| 2003/0057703 | A1 * | 3/2003 | Howes et al. | 290/1 R |
| 2005/0276696 | A1 * | 12/2005 | LeMieux | 416/61 |
| 2008/0086281 | A1 * | 4/2008 | Santos | 702/127 |

FOREIGN PATENT DOCUMENTS

| | | |
|---|---|---|
| DE | 197 31 918 | 1/1999 |
| DE | 198 47 982 | 6/1999 |
| DE | 198 44 258 | 3/2000 |
| DE | 199 34 415 | 2/2001 |
| DE | 101 27 451 | 9/2009 |
| DK | 9800589 | 10/1999 |
| EP | 0 644 331 | 9/1993 |
| JP | 07-054762 | 2/1995 |
| JP | 2004-84527 A | 3/2004 |
| NZ | 316943 | 11/1998 |
| WO | 93/06653 | 4/1993 |
| WO | 01/33075 | 5/2001 |

OTHER PUBLICATIONS

Dadone et al., "Estimator-Based Adaptive Fuzzy Logic Control Technique for a Wind Turbine-Induction Generator System," Proceedings of the 7th Mediterranean Conference on Control and Automation (MED99) Haifa, Israel, Jun. 28-30, 1999, pp. 210-221.

Giebhardt et al., "Erste Einsatzerfahrungen mit einem Fehlerfruherkennungssystem fur Windkraftenlagen," 6. Fachkolloquium Technische Diagnostik u. Moderne Automatisierung Hrsg.: Innovations u. Bildungszentrum Hohen Lockow e.V., 1998 (English translation provided for relevant sections: Chapter 4, $2^{nd}$ paragraph, Chapter 3, Figure 5, Chapter 3, last paragraph, and Chapter 4, $1^{st}$ paragraph.

Hau, E., "Windkraftanlagen: Grundlagen, Technik, Einsatz Wirtschaftlichkeit," Springer-Verlag, Berlin, Germany 1996, pp. 100-109 (includes English translation, "Windturbines: Fundamentals, Technologies, Application and Economics," 2000, corresponding pp. 99-109).

Hau, E. Windkraftanlagen: Grundlagen, Technik, Einsatz Wirtschaftlichkeit, Springer-Verlag, Berlin, Germany 1996, pp. 454-457 (includes English translation, "Windturbines: Fundamentals, Technologies, Application and Economics," 2000, corresponding pp. 441-443).

Hau E., Wind Turbines, "Aerodynamic Power Control", excerpt p. 83.

International Search Report for WO/2001/033075 (PCT/DK99/00595), filed Nov. 3, 1999.

Lübbert, D., "Zeitreihenstatistik" (English translation:"Time Series Statistic"), Ruhr-Universität Bochum, 1999, pp. 1-12.

Molly, J. P., "Windenergie: Theorie, Anwendung, Messung 2. Auflage," Verlag C.F. Muller GmbH Karlsruhe, Germany, 1990, pp. 196, 201, and 208 (English translation provided for relevant sections).

Program Conference for Boreas VI, DEWI Magazine, No. 22, Feb. 2003, pp. 89-92.

Richlinie fur die Zertifizierung von Windenergieanlagen Germanischer Lloyd WindEnergie GmbH, Hamburg, Germany, 2003, Chapter 2.3.2.18.2, pp. 2.15 (English translation of relevant paragraph provided).

Rindanpaa, P. et al., "Reducing Cost of Wind Energy by Self-Tuning Controller," European Wind Energy Conference, Nice, France, Mar. 1-5, 1999, pp. 873-876.

Schroder, D., "Elektrische Antriebe-Regelung von Antriebssystemen," Chapter 14, Section 14.7: Adaptive Verfahren, 2001, pp. 556-557.

Seifert et al., "Risk Analysis of Ice Throw from Wind Turbines," Paper Presented at BOREAS, Apr. 6 and 9-11, 2003, Pyha, Finland, 9 pages.

"What are Moving Average or Smoothing Techniques?", e-Handbook of Statistical Methods, Jan. 2003, NIST/Sematech, Chapter 6.4.2.

Caselitz et al., "Abschlußbericht zum Foschungsvorhaben—Fehlerfrüherkennung in Windkraftanlagen," Excerpts pp. 1-50 and 113-194, dated Jun. 24, 1999, 132 pages.

Opposition's Letter to the European Patent Office, in response to the summons to oral proceedings, dated Jul. 7, 2011, letter dated Oct. 28, 2011, 8 pages.

Kruger, T., "Control Methods for Wind Turbines to Reduce the Mechanical Stress," Dissertation, University of Kassel, Apr. 22, 1998, 169 pages. (Includes English translation of relevant section.).

Seifert, H., "Operation of Wind Turbines in Icing Conditions," Results and Recommendations from an EU Research Project, German Wind Energy Institute GmbH, Wilhelmshaven, Germany, AUF WIND 99 St. Pölten, Oct. 21 and 22, 1999, 11 pages. (Includes English summary.).

* cited by examiner

METHOD FOR OPERATING A WIND TURBINE

CROSS-REFERENCES TO RELATED APPLICATIONS

This application is a continuation of U.S. patent application Ser. No. 10/558,041, filed Nov. 6, 2006, now pending, which is a 371 of PCT/EP2004/005164, filed May 14, 2004, which claims priority to DE 10323785.2, filed May 23, 2003. These three applications are incorporated herein by reference in their entireties.

TECHNICAL FIELD

The present disclosure relates to a method for operating a wind turbine with the steps: detecting the values of predetermined operating parameters by means of suitable sensors, detecting at least one predetermined initial condition, and comparing the detected values to stored values of operating parameters. The disclosure further relates to a wind turbine for realizing the method.

Here, the term "parameter" or "operating parameter" is used in the sense of a directly detected parameter, but also in the sense of a parameter value derived from a detected value.

BACKGROUND INFORMATION

Wind turbines have already been manufactured for some time in such quantities that it is quite acceptable to talk about series production. In the end, however, each wind turbine is definitely unique, because deviations from optimum settings also occur in series production. As is known, this is definitely not a phenomenon of series production of just wind turbines. Instead, in many areas of daily life there are default values and an acceptable tolerance range, within which deviations from the predetermined values are acceptable and not problematic.

Because the rotor blades of wind turbines are produced with an extraordinarily high percentage of manual labor and reach considerable dimensions, each individual rotor blade is unique. Thus, a wind turbine with three rotor blades already has three unique blades on its rotor. Therefore, a rotor of one wind turbine is not like any other and even the exchange of one rotor blade changes the entire rotor, within the tolerance range.

Accordingly, the operating behavior of each wind turbine also differs from that of all other wind turbines; even when these are of the same type. Even if the deviations lie within the permissible tolerance range, they can nevertheless still lead to power losses.

Wind turbines and especially their parts mounted outside in the area of the gondola, such as the rotor, but also the anemometer, are subject to the risk of icing, especially in winter. Icing of the anemometer can easily lead to measurement errors, which in turn result in unsuitable control of the wind turbine.

Icing of the rotor involves the risk that persons and things in the area of the wind turbine could be injured or damaged due to falling ice. When rotor blades are covered with ice, it cannot be predicted when or how much ice will fall, and the wind turbine must be stopped, in particular, due to icing of the rotor blades, in order to prevent endangering the area.

In the state of the art, various approaches have become known to prevent this problem. Thus, e.g., heated anemometers are available. The heaters of these anemometers should prevent icing. However, such a heater is not complete protection against icing of the anemometer, because, on one hand, the heater could fail and, on the other hand, even a functional heater cannot prevent the formation of ice to arbitrarily low temperatures.

Various designs have also become known for the rotor blades. For example, rotor blades can be heated in order to prevent any formation of ice. However, for large wind turbines with correspondingly large rotor blades, the power consumption needed is considerable. From DE 195 28 862 A1, a system is known in which the turbine is stopped after there is icing and then the rotor blades are heated in order to eliminate the icing of the rotor blades, with power use optimized as much as possible. However, the detection of icing in the state of the art is frequently realized through the detection of an unbalanced rotor, which results when the rotor drops a part of the already-formed ice.

However, the first time ice falls already represents a danger to the area; with increasing size of the rotor blades their mass also increases, so the fall of relatively small amounts of ice does not lead to a detectable imbalance, and reliable detection of ice formation is difficult.

BRIEF SUMMARY OF THE DISCLOSURE

Therefore, the object of the present disclosure is to be able to adapt the operation of a wind turbine to changes. This object is achieved for the method of the type named above such that when the detected parameter values deviate from the stored parameter values as a function of the initial conditions, either the stored parameter values are adapted to the detected parameter values or the operation of the wind turbine is influenced as a function of the detected parameter values.

The disclosure is based on the knowledge that, from a pragmatic view, the formation of ice on a rotor blade also represents a (temporary, meteorologically-related) change of the rotor blade shape, with the result that the formation of ice on the rotor blades of a wind turbine always leads to a change of the aerodynamic profile and thus to a negative effect on the output of the wind turbine. However, manufacturing-dependent deviations of the rotor blades from the predetermined optimum shape and gradual soiling of the rotor blades during operation also lead to deviations from this shape and thus deviations in terms of the generated output.

Now, if predetermined operating parameters, such as wind speed, angle of attack of the rotor blades, and generated output are detected, these can be compared to values stored in the wind turbine. Under consideration of the initial condition of the outside temperature, from which it can be derived whether icing can occur at all, now either the values stored in the wind turbine can be adapted to the actual situation or the operation of the turbine is influenced accordingly.

The initial condition of the outside temperature can be monitored with a temperature sensor. If the outside temperature is 2° C. or higher, then icing can be reliably ruled out and deviation of the values is consequently reliably not traced back to icing, but instead to deviations as a result of tolerances, e.g., in the rotor blade profile. If the temperature falls below 2° C., icing can no longer be reliably ruled out. Consequently, if the parameter values change, icing cannot be ruled out and therefore the operation of the turbine is influenced, e.g., the turbine is stopped.

In order to be able to adapt the parameter values stored in the turbine to continuous changes to the turbine and not to lead to an erroneous detection of ice formation, the parameter values stored in the turbine can be adapted accordingly for (repeated) appearance of deviations. In order to adapt these parameter values, a difference between the stored parameter value and the detected parameter value is determined and, according to this difference, the values of the stored parameter can be changed with a predetermined weight. This weight can be, e.g., a fraction of the amount of the difference, so that a one-time change does not lead to a significant change to the stored parameter values.

The values of the parameters and/or the initial condition can be detected during a time period that can be preset, e.g., 60 s, and/or during a preset number of measurement cycles, in order to reduce the influence of random single events.

Because the wind turbine is controlled with different parameters as a function of the wind speed, the parameters used preferably vary as a function of a second initial condition. Below the wind speed at which the turbine generates nominal output, the turbine is controlled by the generated output and is dependent on, among other things, the wind speed. Accordingly, the wind speed can be determined from the generated output. When the nominal wind speed is reached and exceeded, the turbine always generates the nominal output. In this range, the turbine is controlled by changing the angle of attack of the rotor blades. Accordingly, a wind speed can be allocated to the angle of attack of the rotor blades. Consequently, as a function of reaching the nominal output as an initial condition, the parameter can change between the generated output and rotor blade angle of attack.

BRIEF DESCRIPTION OF THE SEVERAL VIEWS OF THE DRAWINGS

An embodiment of the disclosure is explained in more detail below with reference to the figures. Shown are.

DETAILED DESCRIPTION

Embodiments of techniques for operating a wind turbine are described herein. In the following description, numerous specific details are given to provide a thorough understanding of embodiments. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
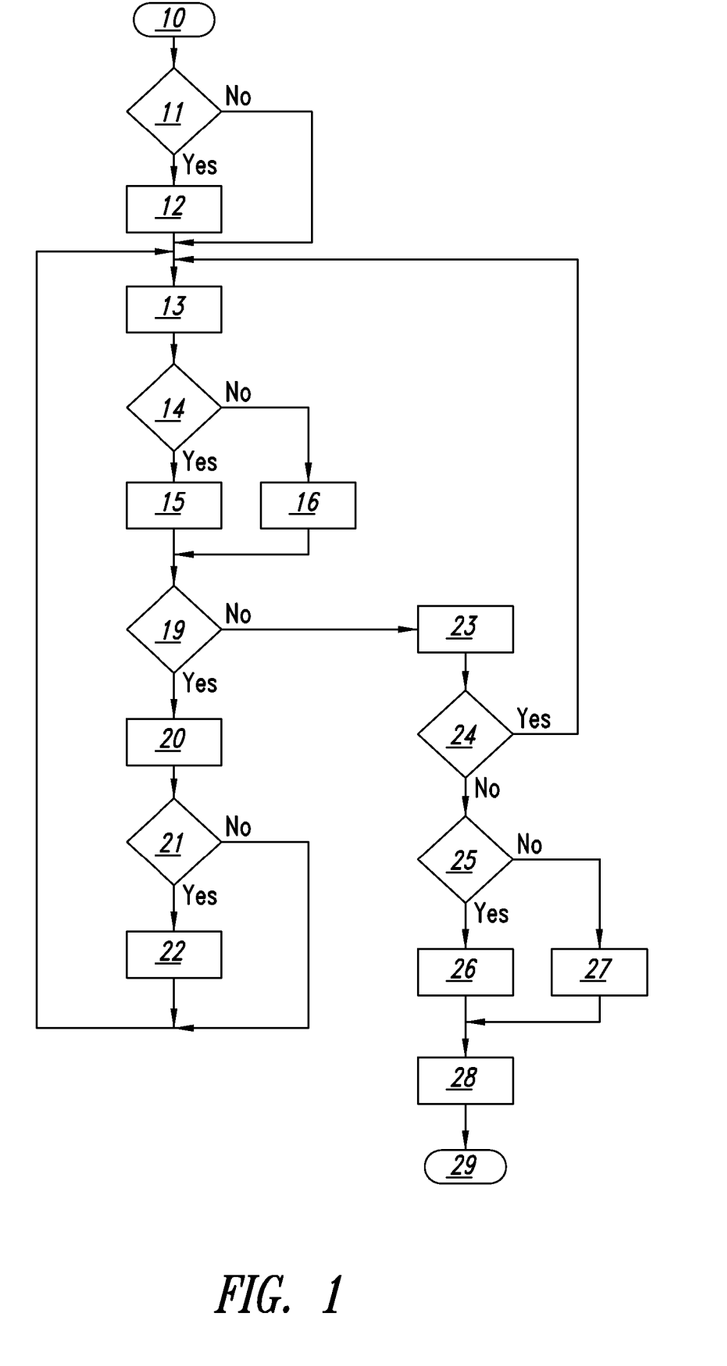
FIG. 1, a flow chart of the method according to the disclosure.

The individual steps are designated with reference symbols in the flow chart shown in FIG. 1. Step 10 is the beginning of the flow chart. In Step 11, it is tested whether this is the first startup of this wind turbine. The branch extending downwards symbolizes the answer "yes" and the branch extending to the right symbolizes the answer "no." If this is the first startup of the turbine, then in Step 12, typical standard values are recorded in a memory. If this is not the first startup, this Step 12 is skipped.

In Step 13, the generated output $P_{actual}$, the rotor blade angle of attack $\alpha$, and the wind speed $v_W$ are detected. In Step 14, it is tested whether the generated output $P_{actual}$ is the nominal output $P_N$. If this is the case, the process continues via the bottom branch to Step 15. There, the rotor blade angle of attack $\alpha$ is selected as the parameter. If the generated output is not the nominal output, i.e., if it is less than the nominal output, the right branch is used and the process continues with Step 16, where the generated output $P_{actual}$ is selected as the parameter. In the subsequent Step 19, it is tested whether the outside temperature u is at least 2° C. If this is the case, the process continues via the bottom branch to Step 20.

The detection of the outside temperature u can be realized by means of a thermometer. Naturally, there can also be another thermometer, optionally at a different location, wherein the temperatures detected by these thermometers can be checked with one another for plausibility.

In Step 20, depending on the parameter determined in Steps 14, 15, and 16, blade angle of attack $\alpha$ or generated output $P_{actual}$, the associated wind speed $v_K$ is determined from the data stored in the wind turbine. Then this wind speed $v_K$ is compared to the detected wind speed $v_W$. In Step 21, it is tested whether the detected wind speed deviates from the stored wind speed. If this is the case, the process continues via the bottom branch, and in Step 22, a new value is defined for the stored parameter value and stored in the wind turbine.

This new value is multiplied by a factor of 0.05 as a weighting factor and added to the previous value, taking its sign into account. If a smaller value is produced, then 1/20 of the difference from the previously stored value is subtracted; if a higher value is produced, 1/20 of the difference is added to this value. After this newly determined value has been stored, the generated output $P_{actual}$, the rotor blade angle of attack $\alpha$ and the wind speed $v_W$ are detected again and the process is executed again beginning at Step 13.

Naturally, the weighting factor can also assume any other suitable value. Here, it is easy to see that for a larger weighting factor, the stored values are adapted to the detected values more quickly than for a smaller weighting factor.

The weighting factor can also be changed, e.g., as a function of the magnitude of the difference between the detected value and the stored value. The greater the difference, the smaller the weighting factor can be, in order to reduce the influence, e.g., due to a large difference, or vice versa.

Alternatively, a weighting factor can be eliminated. Instead, the stored values can be adapted to the detected values independently or in steps dependent on the differences with predetermined amounts. Thus, the adaptation can always be realized with a value w, or for a predetermined first range of the difference amount, a first predetermined value $w_1$ is used, and for a predetermined second range of the difference amount, a predetermined second value $w_2$ is used, and for a third range, a value $w_3$, etc.

If the value determined in Step 20 does not deviate at all or not significantly from the stored value, the process continues from Step 21 via the right branch and Step 22 is bypassed. Accordingly, this Step 22 can be spared and thus the load on the processor that is used is reduced.

In Step 19, if it is determined that the temperature is not at least 2° C., icing of the rotor blades can no longer be reliably ruled out. Accordingly, the process branches via the side branch to Step 23. In Step 23, in turn, according to the detected parameters, the wind speed $v_W$ allocated to the stored parameter value is determined.

In Step 24, it is tested whether (under consideration of a tolerance range) the wind speed $v_K$ determined from the stored parameter values agrees with the detected wind speed $v_W$. If this is the case, the process returns via the side branch to Step 13 and the process continues, in turn, with the detection of the generated output $P_{actual}$, the rotor blade angle of attack α, and the wind speed $v_W$.

In Step 24, when it is recognized that the detected wind speed $v_W$ does not agree with the wind speed $v_K$ determined from the stored values, in Step 25 it is tested whether the detected wind speed $v_W$ is smaller than the wind speed $v_K$ determined from the parameter values.

If this is the case, the process continues via the bottom branch and, in Step 26, anemometer icing is assumed, because it results from the output generated by the turbine or from the blade angle of attack that the wind speed must be higher than that detected by the anemometer.

If the detected wind speed $v_W$ is not smaller than the wind speed $v_K$ determined from the stored parameter values, the process continues via the side branch and Step 25.

Because it is known from Step 24 that the detected wind speed $v_W$ is not equal to the wind speed determined from the stored parameter values $v_K$, and because the detected wind speed $v_W$ is also not smaller than the wind speed $v_K$ determined from the stored parameter values, it must therefore be greater. However, for this greater wind speed, if a smaller output is generated or a smaller rotor blade angle of attack is detected, it necessarily follows that the aerodynamic behavior of the rotor blades is changed. Because it is known from Step 19 that the temperature lies below 2° C., icing of the rotor blades cannot be ruled out. Accordingly, in Step 27 icing of the rotor blades is now assumed.

Both icing of the anemometer assumed in Step 26 and also icing of the rotor blades assumed in Step 27 lead to stoppage of the turbine in Step 28. Thus, risk to the surroundings is reliably ruled out in each case.

The entire process then ends in Step 29.

Figure 2:
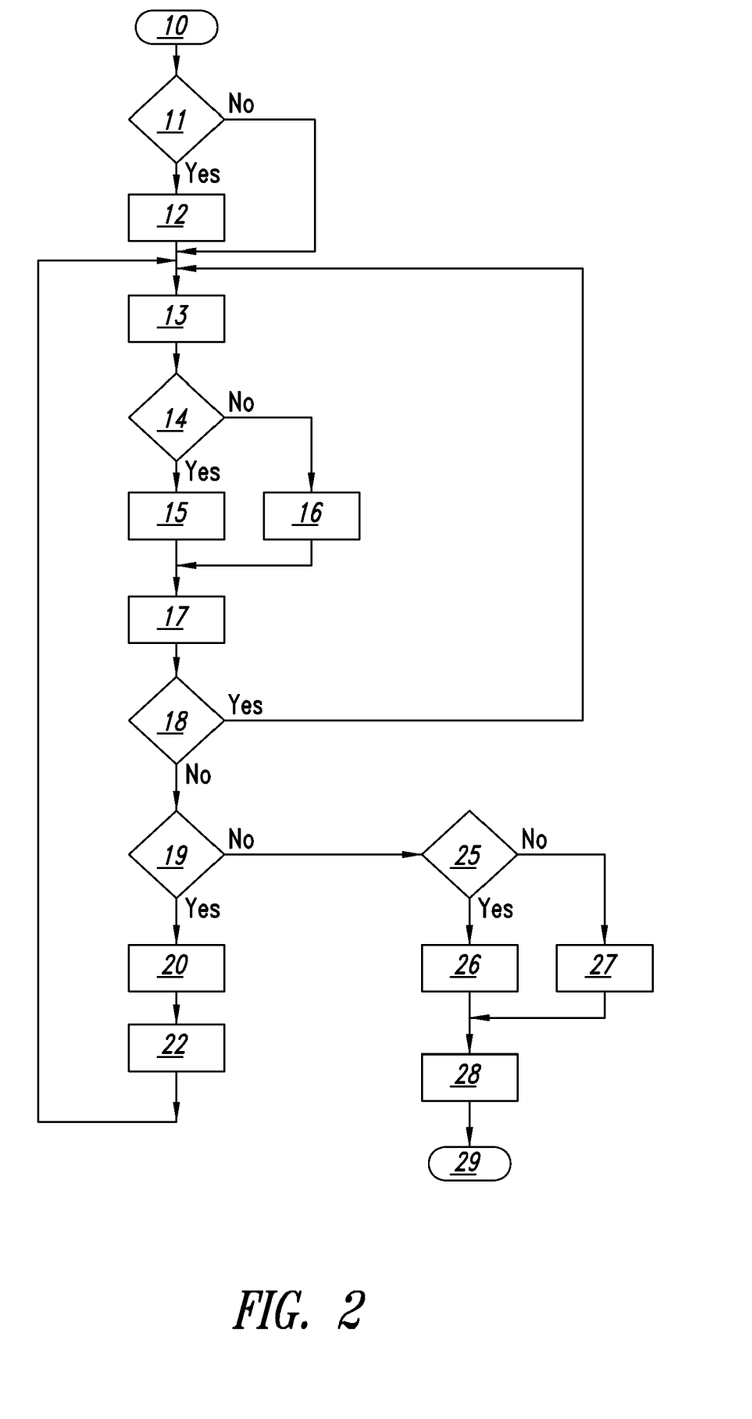
FIG. 2, a flow chart of an alternative embodiment of the method.

In the flow chart shown in FIG. 2, the individual steps are designated with reference symbols. Step 10 is the beginning of the flow chart. In Step 11, it is tested whether it is the first startup of this wind turbine. The branch extending downwards symbolizes the answer "yes" and the branch extending to the right symbolizes the answer "no." If it is the first startup, then typical turbine standard values are recorded in a memory in Step 12. If it is not the first startup, Step 12 is skipped.

In Step 13, the generated output $P_{actual}$, the rotor blade angle of attack α, and the wind speed $v_W$ are detected. In Step 14, it is tested whether the generated output $P_{actual}$ is the nominal output $P_N$. If this is the case, the process continues via the bottom branch to Step 15. There, the rotor blade angle of attack α is selected as the parameter. If the generated output is not the nominal output, it is consequently smaller than the nominal output, the right branch is used and the process continues with Step 16, where the generated output $P_{actual}$ is selected as the parameter.

Accordingly, in Step 17, the stored wind speed $v_K$ allocated to the parameter selected in Step 15 or Step 16 is determined. A tolerance range with a width that can be preset is allocated to this wind speed $v_K$. This width can vary, e.g., as a function of the installation site of the wind turbine.

At installation sites with higher risk to the surroundings, e.g., in the vicinity of buildings, a quick reaction by the controller of the wind turbine to deviations of the stored values can be realized through a tight tolerance range. For this tight tolerance range, empirical values of ±0.5 m/s to ±2 m/s, preferably ±1.2 m/s have been determined. For areas with lower risks, a range of ±1 m/s to ±3 m/s, preferably ±2 m/s is given as useful.

In Step 18, it is tested whether the detected wind speed $v_W$, under consideration of the tolerance range, agrees with the wind speed $v_K$ determined from the stored values. If this is the case, the process continues via the right branch from Step 18 and returns to Step 13. There, the wind speed $v_W$, the rotor blade angle of attack α, and the generated output $P_{actual}$ are detected again.

If the detected wind speed $v_W$ does not agree with the stored wind speed $v_K$ (naturally, in turn, under consideration of the tolerance range), the process continues in Step 18 through the bottom branch to Step 19.

In Step 19, it is tested whether the outside temperature u equals at least 2° C. If this is the case, the process continues via the bottom branch to Step 20.

In Step 20, the associated wind speed $v_K$ is determined from the data stored in the wind turbine and also the difference values as a function of the parameters blade angle of attack a or generated output $P_{actual}$ determined in Steps 14, 15, and 16. In Step 22, a new value is defined for the stored parameter value and stored in the wind turbine.

This new value is multiplied by a factor of 0.05 as a weighting factor and added to the previous value, taking its sign into account. If a smaller value is produced, then 1/20 of the difference of the previously stored value is subtracted; if a higher value is produced, then 1/20 of the difference is added to this value. After this newly-determined value is stored, the generated output $P_{actual}$, the rotor blade angle of attack α, and the wind speed $v_W$ are detected again and the process is executed again starting at Step 13.

Naturally, the remarks made in the description about FIG. 1 also apply here for the weighting factor.

In Step 19, if it is determined that the temperature is not at least 2° C., then icing of the rotor blades can no longer be reliably ruled out. Accordingly, the process continues via the side branch to Step 25.

In Step 25, it is tested whether the detected wind speed $v_W$ is smaller than the wind speed $v_K$ determined from the parameter values.

If this is the case, the process continues via the bottom branch, and in Step 26, anemometer icing is assumed, because it results from the output $P_{actual}$ generated by the turbine or from the blade angle of attack α that the wind speed must be higher than that detected by the anemometer.

If the detected wind speed $v_W$ is not smaller than the wind speed $v_K$ determined from the stored parameter values, the process continues via the side branch and in Step 25.

Because it is known from Step 24 that the detected wind speed $v_W$ is not equal to the wind speed $v_K$ determined from the stored parameter values, and because the detected wind speed $v_W$ also is not smaller than the wind speed $v_K$ determined from the stored parameter values, this must therefore be larger. However, if a smaller output is generated or a smaller rotor blade angle of attack is detected for this larger wind speed, it necessarily follows that the aerodynamic behavior of the rotor blades has changed. Because it is known from Step 19 that the temperature lies below 2° C., icing of the rotor blades cannot be ruled out. Accordingly, in Step 27, icing of the rotor blades is assumed.

Both icing of the anemometer assumed in Step 26 and icing of the rotor blades assumed in Step 27 lead in Step 28 to stoppage of the turbine. Thus, risk to the surroundings is reliably ruled out in each case.

The entire process then ends in Step 29.

Figure 3:
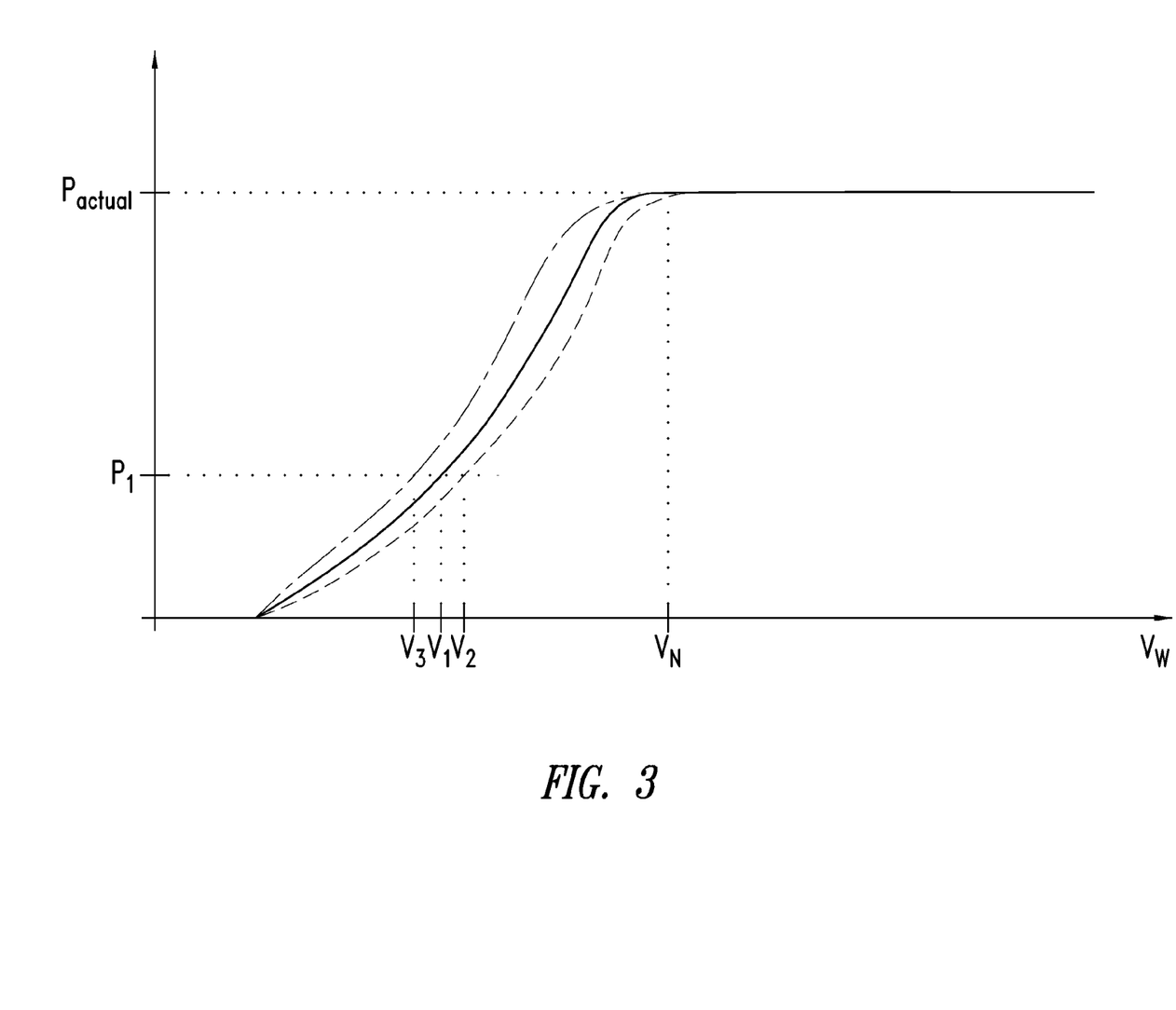
FIG. 3, an example of a predetermined standard characteristic line and characteristic lines determined by measurements.

FIG. 3 shows a representation with three characteristic lines. The wind speed $v_W$ is given on the abscissa of the coordinate system. Here, the wind speed $v_W$ is the parameter relevant up to the nominal wind speed $v_N$, at which the wind turbine reaches its nominal output; above this wind speed $v_N$, the rotor blade angle of attack α is the relevant parameter. However, for reasons of clarity, this is not shown in the figure.

The output P is recorded on the ordinate. The nominal output $P_N$ is indicated.

Let the continuous line be the example for the standard parameter values stored in the wind turbine at the first startup. The dashed line designates a first characteristic line specific to the turbine formed by adapting the stored standard values to the detected values, and the dash-dot line represents a second example of a characteristic line specific to the turbine, also formed by adapting the stored standard values to the detected values. Naturally, only one characteristic line specific to the turbine can apply to one wind turbine.

The first dashed characteristic line running below the continuous characteristic line already gives a hint that the output actually generated by the turbine lies below the output seen in the standard parameters. In contrast, the second, dash-dot characteristic line represents higher outputs in the range up to the nominal wind speed $v_N$.

Below the nominal wind speed $v_N$, the parameter $P_{actual}$ is used. From the dashed characteristic line it follows that the output $P_1$ is generated at a detected wind speed $v_2$. From the (continuous) standard characteristic line, a wind speed $v_1$ is given for the output $P_1$, which lies below the detected wind speed $v_2$. The wind speed $v_2$ detected at the output $P_1$ is thus greater than the wind speed $v_1$ determined from the stored values. At a temperature below 2° C., according to the disclosure, the wind turbine would be turned off under the assumption of rotor blade icing.

At a temperature of at least 2° C., the difference $\Delta v = v_2 - v_1$ would be formed. As a correction value, $\Delta v/20$ is added to the stored value and recorded in the memory instead of the previous value. Because the difference $\Delta v$ has a positive sign, the stored value is shifted in the direction of larger values, thus in the direction $v_2$ with 1/20 of the amount of the difference.

The dash-dot line shows a deviation in the opposite direction. At the output $P_1$, a wind speed $v_3$ is detected which is smaller than the wind speed $v_1$ determined from the standard characteristic line. The difference $v_3 - v_1$ produces, in turn, $\Delta v$, and $\Delta v/20$ is added as the correction value to the stored value. However, in this case, because the difference $\Delta v$ is negative, a value with a negative sign is accordingly added to the stored value, consequently $\Delta v/20$ is subtracted. Thus, here the stored value is also adapted with 1/20 of the difference, taking into account the sign, thus in the direction towards $v_3$.

If the nominal output is reached, thus the nominal wind speed $v_N$ is reached or exceeded, then the generated output $P_{actual}$ is no longer detected as the parameter, but instead, the angle of attack α of the rotor blades is detected as the parameter. The further process corresponds to that explained above. From the detected rotor blade angle of attack α, the allocated wind speed is determined by means of the standard characteristic line (continuous characteristic line). This is compared to the detected wind speed. Here, if differences are produced, these processes are as described above.

Figure 4:
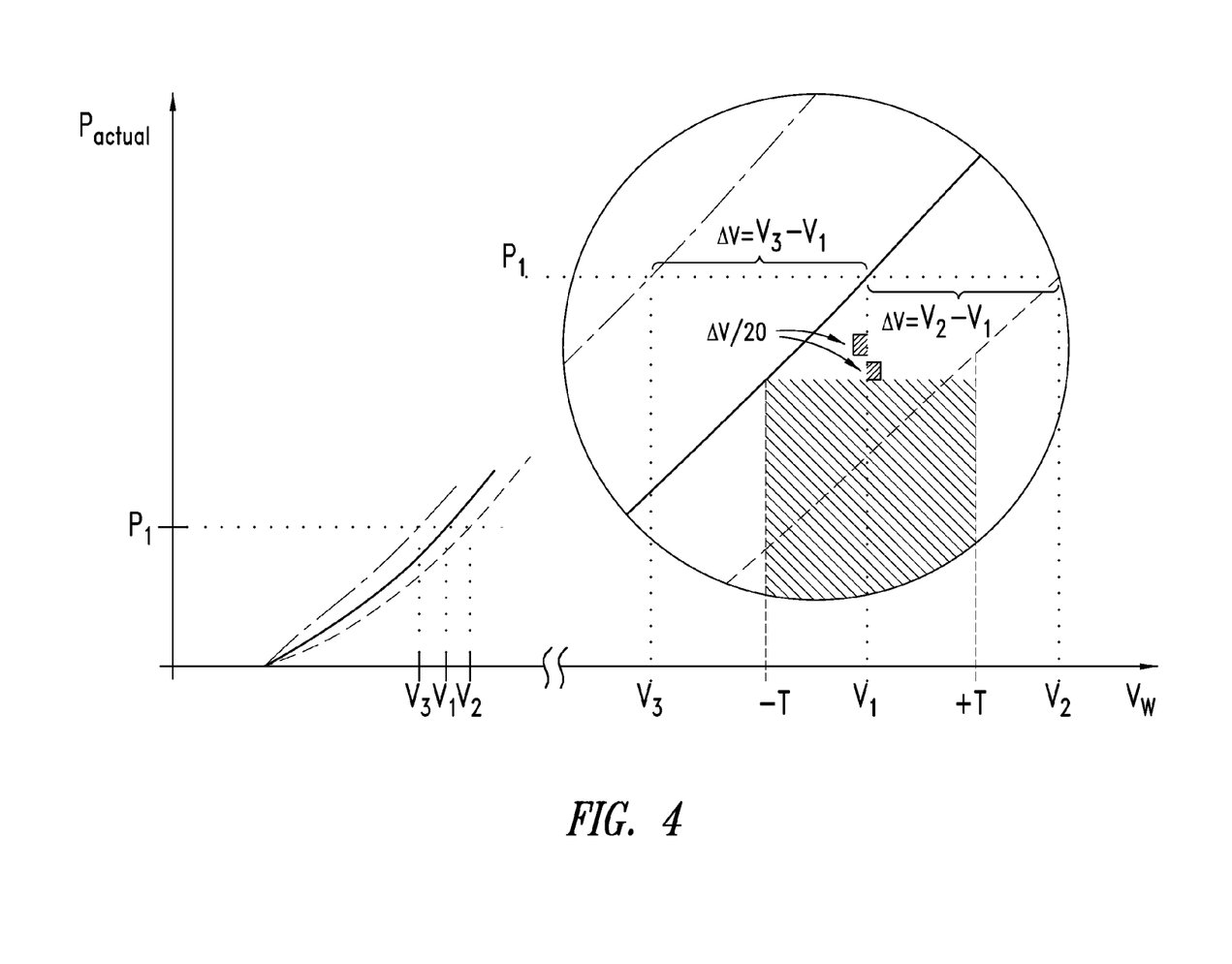
FIG. 4, a representation for illustrating the change of the stored parameter values.

FIG. 4 is an enlarged representation of a section of the characteristic lines shown in FIG. 3 in a range below the nominal wind speed $v_N$. In this FIG. 4, the wind speeds are recorded as in FIG. 3.

Through the enlarged representation, the difference can be seen more easily. The reference wind speed is the wind speed $v_1$ determined from the stored values. This is subtracted from the detected wind speed $v_2$, $v_3$. Accordingly, $\Delta v$ is produced. For the difference $v_2 - v_1$, $\Delta v$ has a positive sign. For the difference $v_3 - v_1$, however, $\Delta v$ has a negative sign.

To prevent too great an influence of these deviations on the stored values, the difference is weighted with a preset factor. In the present case, let this factor be 0.05.

To adapt the stored values to the individual wind turbine, the weighted difference, here, $\Delta v/20$, is added to the stored value $v_1$ or icing is assumed for the appearance of a difference at an outside temperature below 2° C. and the operation of the wind turbine is stopped.

In order not to have to react to every arbitrarily small deviation $\Delta v$, a tolerance range can be provided. This is designated in the figure with $-T$ for the lower limit and $+T$ for the upper limit. For deviations $\Delta v$ in the tolerance range, the turbine continues to operate or the values stored in the wind turbine are not changed. Obviously, the tolerance range can apply, e.g., only for the operational control of the wind turbine. Then, the stored values are adapted even for small changes, but the turbine still continues to operate even at temperatures below 2° C.

According to the installation site of the individual wind turbine, the values for the tolerance range can be set individually. Where a tolerance of ±2 m/s is sufficient for one installation site, a tolerance range of ±1.2 m/s is necessary for a different installation site of the same turbine type.

At a wind speed $v_1$ of 10 m/s, an upper limit of 11.2 m/s and a lower limit of 8.8 m/s are given for ±1.2 m/s as the tolerance. Within this range from 8.8 m/s to 11.2 m/s, the parameters can be adapted, for example, but the turbine continues to operate at low outside temperatures.

In the figure, let $v_1$ equal 10 m/s, $v_2$ equal 12 m/s, and $v_3$ lie at 8.5 m/s. Thus, $\Delta v = v_2 - v_1 = 2$ m/s. The adaptation of the stored value is realized with 1/20, thus, in this example, 0.1 m/s. Because the sign is positive, $v_1$ changes accordingly to 10.1 m/s.

For a difference $\Delta v = v_3 - v_1$ a value of 8.5 m/s − 10 m/s = −1.5 m/s is produced. The adaptation of $v_1$ is realized, in turn, with $\Delta v/20$, thus −0.075 m/s. Therefore, $v_1$ is changed to 9.925 m/s.

The weighting factor determines how fast the stored values are adapted to the detected values. The greater this factor, the faster the adaptation.

However, the detection of the values also has an affect. Typically, in the area of the wind turbines, especially environmental values, such as temperature or wind speed, are not determined from a single measurement, but instead from a plurality of measurement cycles, e.g., 30, or detected over a predetermined time period, e.g., 60 s. The values are then derived from these results, e.g., as arithmetic or geometric means.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the disclosure to the precise forms disclosed. While specific embodiments and examples are described herein for illustrative purposes, various equivalent modifications are possible within the scope of the disclosure and can be made without deviating from the spirit and scope of the disclosure.

These and other modifications can be made to the disclosure in light of the above detailed description. The terms used in the following claims should not be construed to limit the disclosure to the specific embodiments disclosed in the specification and the claims. Rather, the scope of the disclosure is to be determined entirely by the following claims, which are to be construed in accordance with established doctrines of claim interpretation.

The invention claimed is:

1. A wind turbine comprising:
   a plurality of sensor devices configured to detect values of a plurality of operating parameters of the wind turbine, at least one of the plurality of sensors is a temperature sensor configured to detect a temperature outside the wind turbine; and
   a processing device configured to compare the detected values of the plurality of operating parameters to stored values of the plurality of operating parameters, wherein at least one comparison includes a comparison of the detected temperature to a stored threshold temperature, the processing device further configured to take a modifying action based on the comparisons, wherein the modifying action is one of (a) updating the stored values of the plurality of operating parameters with the detected values of the plurality of operating parameters when the temperature outside the turbine is greater than the threshold temperature, and (b) stopping the wind turbine when the temperature outside the turbine is less than or equal to the threshold temperature.

2. The wind turbine of claim 1, wherein the stored values of the plurality of operating parameters are updated based on the deviation being multiplied by a weighting factor.

3. The wind turbine of claim 1, wherein the sensor device is configured to detect the values of the plurality of operating parameters and the temperature outside the wind turbine during a time period.

4. The wind turbine of claim 3, wherein the time period is measured in units of time.

5. The wind turbine of claim 3, wherein the time period is measured in units of measurement cycles.

6. The wind turbine of claim 1, wherein the sensor device is further configured to detect a wind speed.

7. The wind turbine of claim 6, wherein an operation of the wind turbine is modified based on a difference between the detected wind speed and a stored wind speed.

8. The wind turbine of claim 1, wherein the operation of the wind turbine is modified based on the temperature outside the wind turbine being below a temperature threshold.

9. The wind turbine of claim 1, wherein modifying the operation of the wind turbine includes stopping the wind turbine.

10. A method comprising:
   detecting values of a plurality of operating parameters of a wind turbine including a temperature outside the wind turbine;
   comparing the detected values of the plurality of operating parameters to stored values of the plurality of operating parameters including comparing the detected temperature outside the wind turbine to a threshold temperature;
   determining a wind speed from the stored values of the plurality of operating parameters;
   taking a modifying action based on the determined wind speed and the comparison of the detected values of the plurality of operation parameters to the stored values of the plurality of operating parameters, wherein the modifying action is one of (a) updating the stored values of the operating parameters with the detected values of the plurality of operating parameters when the temperature outside the wind turbine is greater than the threshold temperature, and (b) stopping the wind turbine when the temperature outside the wind turbine is less than or equal to the threshold temperature.

11. A wind turbine comprising:
   A plurality of sensors configured to detect a plurality of operating parameters, at least one of the plurality of sensors is a temperature sensor to detect a temperature outside the wind turbine;
   a processor configured to take a modifying action based on a comparison of the temperature outside the wind turbine and a temperature threshold, wherein the modifying action is one of (a) updating stored values of the operating parameters with the detected plurality of operating parameters wherein the stored values of the plurality of operating parameters are updated based on a deviation between the stored operating parameters and the detected plurality of operating parameters being multiplied by a weighting factor, and (b) modifying an operation of the wind turbine.

12. The wind turbine of claim 11, wherein modifying the operation of the wind turbine includes stopping the wind turbine.

13. The wind turbine of claim 11, wherein the processor is further configured to take the modifying action based on a plurality of comparisons between the detected plurality of operating parameters with a plurality of stored operating parameters.

14. The wind turbine of claim 13, wherein the processor is further configured to determine a wind speed from the plurality of stored operating parameters.

15. The wind turbine of claim 14, wherein the processor is further configured to take the modifying action based on the determined wind speed.

* * * * *